E. R. PRUITT.
TEMPORARY FASTENING.
APPLICATION FILED FEB. 14, 1920.
1,426,098.                                          Patented Aug. 15, 1922.
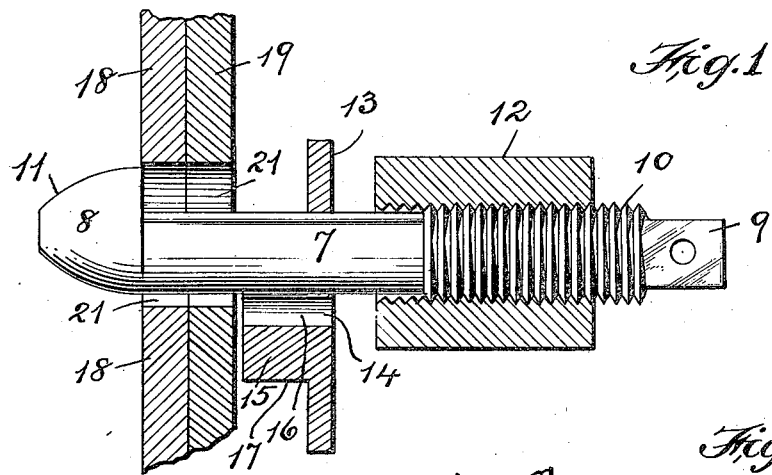
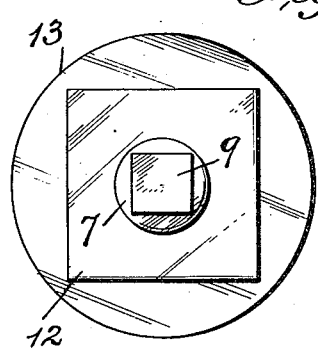
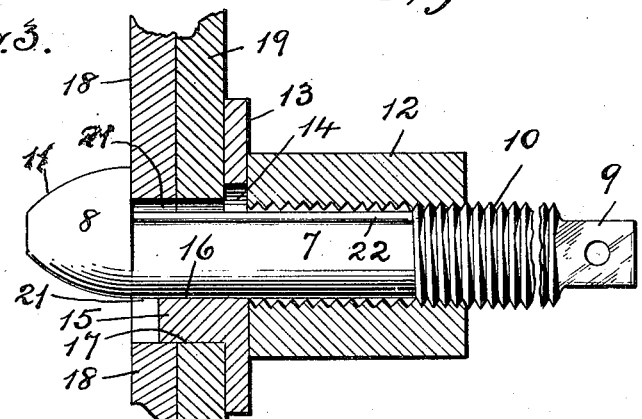
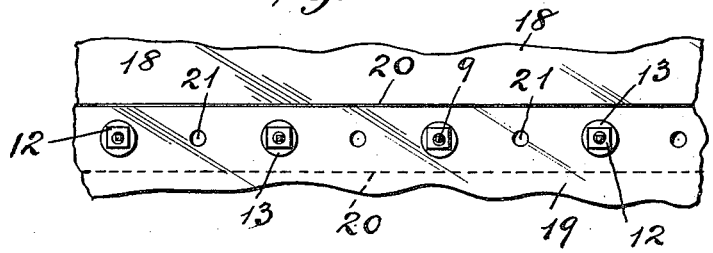
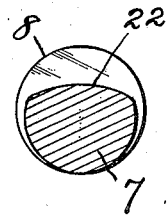
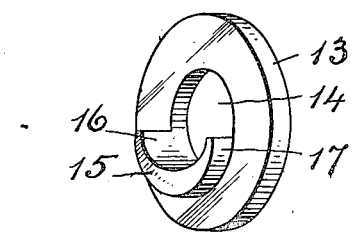
Inventor
Eugene R. Pruitt
By
Mann & Co.
Attorneys

UNITED STATES PATENT OFFICE.

EUGENE R. PRUITT, OF BALTIMORE, MARYLAND.

TEMPORARY FASTENING.

1,426,098. Specification of Letters Patent. Patented Aug. 15, 1922.

Application filed February 14, 1920. Serial No. 358,693.

*To all whom it may concern:*

Be it known that EUGENE R. PRUITT, a citizen of the United States, residing at Baltimore, in the State of Maryland, has invented certain new and useful Improvements in Temporary Fastenings, of which the following is a specification.

This invention relates to a temporary fastening device especially designed for use in structural metal work; such as bridge-work, ship-building, building construction, boiler works, etc. where metal plates, beams, girders and the like are to be riveted together.

The invention has for its object to provide an improved fastening that may be used temporarily to secure the metal parts together at spaced intervals while rivets are placed and secured in the intervening spaces; to provide a fastening that may be placed by one man and which may be quickly attached or as quickly detached; to provide a construction wherein all the parts are held together or assembled and ready for use, and which is exceedingly simple in construction and inexpensive to manufacture.

The invention is illustrated in the accompanying drawing, wherein,—

Fig. 1. shows the improved device partly inserted in the registered perforations of a plurality of metal plates and ready to be hooked therein prior to temporarily locking the plates together.

Fig. 2. illustrates the device engaged with the plates.

Fig. 3. shows the same in front view.

Fig. 4. illustrates the detached centering washer in perspective.

Fig. 5. shows a cross-sectional detail through the bolt-body, and

Fig. 6. illustrates two plates in side view with their edges lapped, their perforations in register and with some of the temporary fastenings in place therein.

Referring to the drawing, the numeral 7, designates a bolt-body having a hook-head 8 at one end thereof and also having an angular sided projection 9, at the opposite end. Between the two ends, the body of the bolt is provided with circumferential screw-threads 10.

In the present instance, the end of the hook-head 8, is beveled or tapered as at 11, which is found useful when entering the headed end through the registering perforations of abutting plates, as will presently be more fully explained.

To readily distinguish one end of the bolt from the other I shall apply the term, inner end, to the head-end 8, and outer end to that end having the angular projection 9.

A nut 12, is screwed onto the outer threaded end 10, of the bolt and by revolution this nut may be made to travel longitudinally on the bolt between the two ends thereof.

I provide a washer 13, on the bolt-body between the nut and the inner hook-end 8 and this washer has a central perforation 14, that is of a diameter sufficient to pass over the threads 10, of the bolt, but which is too small to permit the passage of the head 8 therethrough.

At one side, the washer 13, is provided with a laterally-projecting lug 15, which latter has a concave surface 16, that is flush with the central perforation 14, and also has a convex surface 17, for a purpose that will presently be explained.

This washer is held in place on the bolt-body between the nut 12, and the head 8, so that all the parts are held together in an assembled condition and ready for use.

In Fig. 6, of the drawing I have shown an application of the invention wherein the numeral 18, designates one metal plate and 19, a second metal plate. These two plates have their edges 20, lapped, and the lapped portions of each plate are provided with perforations 21, which latter are brought into register when the plates are placed preparatory to securing them rigidly together by means of rivets.

Prior to the riveting of the plates it is the general practice in many plants to first temporarily fasten the plates at a plurality of points, whereby to hold the perforations of the two plates in register, and to also draw the plates into close contact before the permanent rivets are placed.

The temporary fastenings are usually ordinary headed-bolts and nuts, and to place these ordinary fastenings, it is necessary to insert the headed bolt from one side of the plates and then apply the nuts at the other side of the said plates. This old operation requires the services of two persons, one at each side of the plates, and also consumes considerable time because the nuts must be entirely detached from the bolt-ends before the latter can be inserted through the perforations of the plates. Further time is consumed in engaging the nuts with the bolts and then revolving the nuts numerous times to advance the same on the bolt to the locking positions.

By means of my invention the greater part of the time now consumed in operating the old bolt and nut is saved because the nut is always attached to the bolt and need only be given a few revolutions to seat it tight against the work. Moreover, with my improved device, the entire operation of inserting the bolt and securing it in place, can be effected by one person, and from one side of the plates that are to be secured together.

In Figs. 1 and 2 of the drawing the operation of the device is illustrated.

The two lapped plates 18 and 19, in these instances are shown as being seated close together with their perforations 21, in register.

When the plates with their perforations in register, or the plates and another structure, are all relatively positioned so their perforations will register as shown in Fig. 1, the bolt 7, is inserted by passing its hook-head 8, through the perforations from the outer side of the plates. When the head-end projects on the inside of the innermost plate or structure, that portion of the bolt having the flattened side 22, will have position in the perforations 21.

The washer 13, is then moved forward and the lug 15, at one side thereof is projected into the registered perforations 21, while the rounded side of the bolt-body seats on the concave-surface 16, of the lug which latter forms a seat for the bolt. The insertion of the washer-lug 15, into the perforations 21, seats the convex surface 17, on the rounded wall of the perforation and also elevates the bolt-body in the perforations 21, so that the hook-end 8, at the inner side of the plate 18, will project over the rim-edge of the perforation of that plate, as shown in Fig. 2.

When the washer 13, is in place its circular flange portion will seat against the outer side of the plate 19, so that the nut 12, may be screwed forward on the bolt-thread 10, until the end of the nut seats against the washer and draws on the bolt, whereupon the two plates and washer will be rigidly clamped between the head 8 and the nut 12, as shown in Fig. 2, of the drawing.

These temporary fastenings are usually placed at spaced-apart intervals and when in place, the intervening perforations in the lapped plates are free and exposed so the permanent rivets may be secured therein. After these permanent rivets are in place, the temporary fastenings may be removed one at a time and a permanent rivet substituted.

The withdrawal of the temporary fastening is effected by loosening the nut 12, sliding the washer 13 laterally on the bolt until the lug 15, is withdrawn from the plate perforations 21, which will allow the bolt to drop down in those perforations until the head 8, again registers with the latter, whereupon the bolt may be drawn laterally from the plates and entirely disengaged.

The entire operation of applying or removing the fastenings is effected from the one side of the plates and by one person.

By beveling or tapering the hook-head 8, the same may be used to aline the perforations in the several plates during assembling.

The flattening of one side 22, of the bolt 7, forms a notch-like recess or surface on that side so the washer 13, may be readily moved longitudinally on the bolt between the head and nut.

Having described my invention, I claim,—

1. In a temporary fastening the combination with a bolt having a hook-head at one end thereof and provided with circumferential screw-threads adjacent to the other end, a portion of the bolt being threadless between the head and threaded end said threadless portion having a smaller diameter than the diameter through the threaded portion and a nut having an interior threaded portion to engage the threaded portion of the bolt said interior threaded portion of the nut being of a greater diameter than the threadless portion of the bolt.

2. In a temporary fastening the combination with a bolt-body having a circular threaded portion near one end and a hook-head at the other end, said bolt-body between the threaded portion and the hook-head being non-circular whereby to produce a flattened side, and a nut having a threaded interior that will pass freely over the non-circular and flattened side of the body said threaded nut being of a diameter to engage the threads on the said body.

3. The combination with a plurality of plates with registering rivet-holes therein, of a bolt-body of less diameter than the diameter of the holes in the plates said bolt-body having a hook-head at one end and a threaded portion adjacent to the opposite end thereof, a washer plate on the bolt body said plate having a projection at one side which projection has a concave surface to receive the rounded surface of the bolt-body and said projection also having a convex surface to engage the rounded surface of the plate-holes and a nut on the threaded part of the body.

In testimony whereof I affix my signature.

EUGENE R. PRUITT.